United States Patent [19]

Zani

[11] 4,204,607
[45] May 27, 1980

[54] COOKING UTENSIL

[76] Inventor: Tarcisio Zani, Lumezzane Pieve, Via IV Novembre 3, Brescia, Italy

[21] Appl. No.: 956,844

[22] Filed: Nov. 2, 1978

[51] Int. Cl.² .................. B65D 7/22; A47J 27/022; B65D 7/44
[52] U.S. Cl. .................................... 220/68; 126/390
[58] Field of Search ......................... 220/68; 126/390

[56] References Cited

U.S. PATENT DOCUMENTS

| 555,457 | 2/1896 | Lisk | 220/68 |
|---|---|---|---|
| 1,717,450 | 6/1929 | Hostettler | 126/390 |
| 2,151,535 | 2/1939 | Scurlock | 126/390 |
| 2,517,584 | 8/1950 | Mapes | 220/68 |

FOREIGN PATENT DOCUMENTS

| 1409808 | 7/1965 | France | 220/68 |
|---|---|---|---|
| 505955 | 5/1939 | United Kingdom | 220/68 |

*Primary Examiner*—George E. Lowrance

[57] ABSTRACT

A stainless steel cooking utensil is provided with a bottom layer or insert fully enclosed between the base of the cooking utensil and a protective outer base member to eliminate dirt and grease catching spaces. A brazing material is provided all around the bottom layer, which may be made of aluminum and which is disc-shaped, while the peripheral rim of the protective member, which may be made of stainless steel, may be flared upwardly and outwardly.

6 Claims, 3 Drawing Figures

COOKING UTENSIL

It is well known to provide stainless steel cooking utensils, such as pots and pans, with a double base. That is, with a bottom layer or insert of different material, usually copper, sandwiched between the bottom surface of the utensil and a base member of stainless steel. Such utensils, however, are not free of disadvantages originating from the manner in which the bottom layer or insert is applied to the body of the utensil. There are in fact some utensils wherein the borders or rims of the bottom layer or insert are visable; further, other prior art utensils have a protective member which shows a border girding the bottom layer or insert, without however, being attached to the base of the utensil. This results in a space between the border of the protective member and the outer surface of the base of the utensil that readily forms a collecting area for dirt and grease which is difficult to remove even with the most careful washing.

The present invention, therefore, relates to an improved cooking utensil of the type mentioned hereinabove and provides a bottom layer or insert, preferably of aluminum, which is completely enclosed within a protective member of stainless steel that is attached to the base of the utensil. This arrangement fully obviates the above described drawbacks and insures a better utilization of the cooking utensil.

Figure 1:
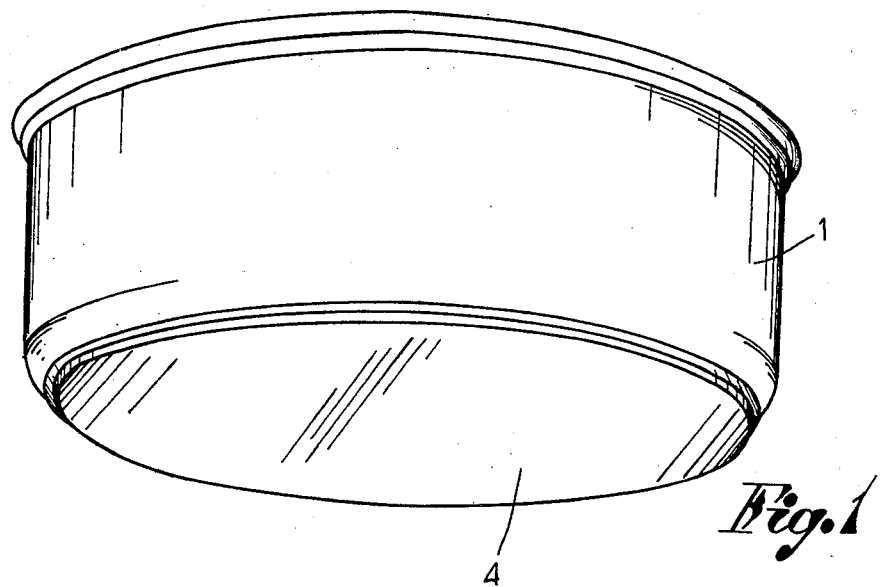
Figure 3:
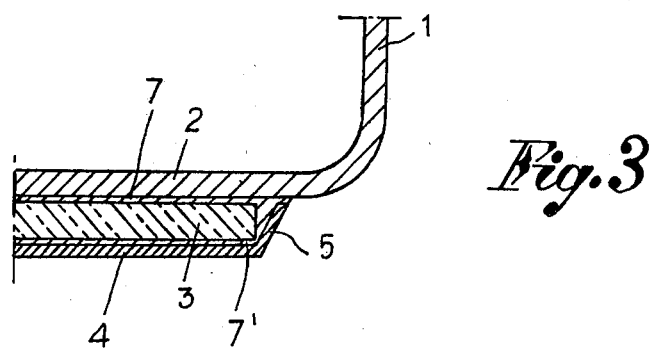
Figure 2:
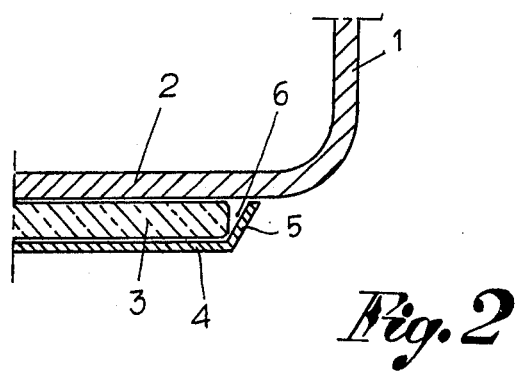

These and other features and advantages of the invention will become more apparent from the following detailed description thereof and from the accompanying illustrative but not limitative drawings, in which:

FIG. 1 is a perspective view from the bottom that shows a cooking pot provided with the bottom layer or insert of the present invention; and FIGS. 2 and 3 are fragmentary elevational views that show, on an enlarged scale, a section of the base of the utensil before and after the attachment of the bottom layer or insert, respectively.

Referring now to the accompanying drawings, the body 1 of the stainless steel cooking utensil is provided on the outer surface of the base 2 thereof with a bottom, disc-like layer or insert 3, for example made of aluminum, enclosed by a protective member 4 which may be made of stainless steel.

The protective member 4 is provided with a peripheral border 5 that may be slightly flared or inclined and which runs adjacent the circumferential surface of the bottom layer or insert 3, so as to define therewith a spacing 6.

The attachment of the layer and of the protective member 4 to the base of the utensil is effected by means of a brazing operation, interposing between the surfaces to be attached a suitable brazing material 7-7'. With the heating of the utensil during the brazing operation, the brazing material 7-7' distributes itself uniformly between the adjacent surfaces of the members, as well as within the spacing 6 between the bottom layer 3 and the rim 5 and also between the rim 5 and the base of the utensil. In this manner, the peripheral rim 5 of the protective member 4 also becomes fully attached to the base of the utensil, forming a single unit and a recessless surface.

From the above description of the invention, one can fully appreciate the above-mentioned advantages of the invention, as well as the possibility of employing a layer or insert of aluminum, which is considerably more economical than previously used materials, while retaining a very highly satisfactory heat conductivity.

I claim:

1. Stainless steel cooking utensil comprising a base surface, a protective member having a surface opposed to said base surface and a disc-like insert positioned between said base surface and said insert and attached thereto, said insert being enclosed fully between said base surface of said utensil and said opposing surface of said protective member, said protective member having a peripheral rim running adjacent the periphery of said insert so as to define therewith a spacing, a brazing material being provided between the surfaces to be attached, said brazing material extending within and fully occupying said spacing between said peripheral rim of said protective member and said base surface of said utensil whereby said insert is fully enclosed by said protective member and said protective member is fully attached to both said insert and said bottom surface.

2. The cooking utensil according to claim 1, wherein said protective member fully encloses said insert and is itself attached to the said base surface of the utensil, so as to form therewith a continuous surface.

3. The cooking utensil according to claim 1 wherein said insert is made of aluminum.

4. The cooking utensil according to claim 1 wherein said peripheral rim of said protective member is flared outwardly.

5. The cooking utensil according to claim 1 wherein said brazing material completely fills the space between said base surface and said insert and between said insert and said protective member to thereby eliminate dirt and grease catching spaces.

6. The cooking utensil according to claim 1 wherein said protective member is made of stainless steel.

* * * * *